US006308187B1

(12) United States Patent
DeStefano

(10) Patent No.: US 6,308,187 B1
(45) Date of Patent: Oct. 23, 2001

(54) COMPUTER SYSTEM AND METHOD FOR ABSTRACTING AND ACCESSING A CHRONOLOGICALLY-ARRANGED COLLECTION OF INFORMATION

(75) Inventor: George Francis DeStefano, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/020,679

(22) Filed: Feb. 9, 1998

(51) Int. Cl.[7] .................................................... G06F 15/00

(52) U.S. Cl. ........................ 707/526; 707/500; 707/513; 707/514; 345/356; 345/357; 345/115; 345/117

(58) Field of Search ............................. 707/526, 513–514, 707/102, 500; 345/334, 341, 356–357, 123, 419, 115–117; 700/17, 18; 703/22

(56) References Cited

U.S. PATENT DOCUMENTS

| | | | |
|---|---|---|---|
| 4,663,616 | 5/1987 | Himelstein | 340/724 |
| 4,964,077 | 10/1990 | Eisen et al. | 364/900 |
| 5,122,972 | 6/1992 | Richards et al. | 395/157 |

(List continued on next page.)

OTHER PUBLICATIONS

Billinton et al., Application of Sequential Monte Carlo Simulation to Evaluation of Distributions of Composite System Indices, 3/97, Generation, Transmission and Distribution, vol. 144, pp. 87–90.*

Elder et al., "Architecture for Platform and Presentation Independent User Interface for Applications", *IBM® Technical Disclosure Bulletin*, vol. 38, No. 1, pp. 297–302, (1/95).

Brittan, David, "MIT Reporter", *Technology Review*, pp. 12–14, (2/97).

Screen shots of Corel® WordPerfect 6.1 Find/Replace Text, FIG. 1, p. 1, (1996).

*Primary Examiner*—Stephen S. Hong
*Assistant Examiner*—Cong-Lac Huynh
(74) *Attorney, Agent, or Firm*—Wood, Herron & Evans; Scott A. Stinebruner

(57) ABSTRACT

A computer system and method concurrently present multiple development threads represented by a collection of chronologically-arranged information. An abstraction stack is used to access a body of knowledge stratified into a plurality of levels of abstraction and including a plurality of information elements associated with the plurality of levels of abstraction and organized generally chronologically in the body of knowledge. The abstraction stack concurrently displays first and second representations of a common portion of the body of knowledge, with the first and second representations respectively displaying first and second information elements respectively associated with first and second levels of abstraction. The first and second levels of abstraction are respectively associated with separate development threads such that such threads are concurrently presented to a user. The development threads may be defined in a number of manners, including but not limited to different points of view, perspectives, writing styles, levels of comprehension and levels of detail. Moreover, further stratification of a body of knowledge may be performed to define additional abstraction schemes for the body of knowledge such that multiple representations of each development thread may be concurrently presented. A computer system and method may also stratify information using multiple abstraction schemes such that various information elements from a collection of information may be concurrently displayed in such a manner that the relationship of the information elements in terms of the multiple abstraction schemes may be presented to a user.

37 Claims, 5 Drawing Sheets

U.S. PATENT DOCUMENTS

| | | | |
|---|---|---|---|
| 5,186,629 | 2/1993 | Rohen | 434/114 |
| 5,237,654 * | 8/1993 | Shackelford et al. | 707/102 |
| 5,255,356 | 10/1993 | Michelman et al. | 395/148 |
| 5,297,249 | 3/1994 | Bernstein et al. | 395/156 |
| 5,335,320 | 8/1994 | Iwata et al. | 395/155 |
| 5,361,361 | 11/1994 | Hickman et al. | 395/700 |
| 5,363,482 | 11/1994 | Victor et al. | 395/157 |
| 5,416,903 | 5/1995 | Malcolm | 395/155 |
| 5,438,662 | 8/1995 | Randall | 395/161 |
| 5,461,399 | 10/1995 | Cragun | 345/145 |
| 5,483,632 | 1/1996 | Kuwamoto et al. | 395/156 |
| 5,610,828 | 3/1997 | Kodosky et al. | 364/489 |
| 5,613,134 | 3/1997 | Lucus et al. | 395/788 |
| 5,615,326 | 3/1997 | Orton et al. | 395/356 |
| 5,638,523 | 6/1997 | Mullet et al. | 395/326 |
| 5,689,642 | 11/1997 | Harkins et al. | 395/200.04 |
| 5,694,561 | 12/1997 | Malamud et al. | 395/346 |
| 5,729,704 | 3/1998 | Stone et al. | 395/346 |
| 5,751,283 | 5/1998 | Smith | 345/342 |
| 5,754,176 | 5/1998 | Crawford | 345/338 |
| 5,760,772 | 6/1998 | Austin | 345/342 |
| 5,771,042 | 6/1998 | Santos-Gomez | 345/342 |
| 5,796,402 | 8/1998 | Ellison-Taylor | 345/342 |
| 5,808,610 | 9/1998 | Benson et al. | 345/342 |
| 5,812,804 | 9/1998 | Bates et al. | 395/342 |
| 5,815,151 | 9/1998 | Argiolas | 345/342 |
| 5,819,055 | 10/1998 | MacLean et al. | 395/342 |
| 5,819,301 | 10/1998 | Rowe et al. | 707/513 |
| 5,825,335 | 10/1998 | Palmer et al. | 345/336 |
| 5,835,088 | 11/1998 | Jaaskelainen, Jr. | 345/343 |
| 5,856,826 | 1/1999 | Craycroft | 345/346 |
| 5,874,962 | 2/1999 | de Judicibus et al. | 345/342 |
| 5,875,302 * | 2/1999 | Obhan | 395/200.55 |
| 5,890,177 * | 3/1999 | Moody et al. | 707/511 |
| 5,894,311 | 4/1999 | Jackson | 345/440 |
| 5,900,876 | 5/1999 | Yagita et al. | 345/350 |
| 5,909,690 | 6/1999 | Tanigawa et al. | 707/526 |
| 5,973,702 | 10/1999 | Orton et al. | 345/433 |
| 6,002,401 | 12/1999 | Baker | 345/349 |
| 6,006,227 * | 12/1999 | Freeman et al. | 707/7 |
| 6,012,072 | 1/2000 | Lucas et al. | 707/526 |
| 6,031,989 | 2/2000 | Cordell | 395/701 |
| 6,074,427 * | 6/2000 | Fought et al. | 703/21 |
| 6,088,032 | 7/2000 | Mackinlay | 345/355 |
| 6,097,375 | 8/2000 | Byford | 345/169 |
| 6,144,962 * | 11/2000 | Weinberg et al. | 707/10 |
| 6,177,933 | 1/2001 | Young | 345/333 |
| 6,184,885 * | 2/2001 | DeStefano | 345/356 |

* cited by examiner

COMPUTER SYSTEM AND METHOD FOR ABSTRACTING AND ACCESSING A CHRONOLOGICALLY-ARRANGED COLLECTION OF INFORMATION

CROSS-REFERENCE TO RELATED APPLICATIONS

This application is related to the following co-pending applications which were filed on even date herewith by George Francis DeStefano: U.S. Ser. No. 09/020,668 entitled "COMPUTER SYSTEM AND METHOD FOR AUTHORING, ABSTRACTING AND ACCESSING A BODY OF KNOWLEDGE" (RO997-003); U.S. Ser. No. 09/020,534 entitled "COMPUTER SYSTEM, METHOD AND USER INTERFACE COMPONENTS FOR ABSTRACTING AND ACCESSING A BODY OF KNOWLEDGE" (RO997-004); and U.S. Ser. No. 09/020,680 entitled "COMPUTER SYSTEM AND METHOD FOR CONTROLLING THE SAME UTILIZING A USER INTERFACE CONTROL INTEGRATED WITH MULTIPLE SETS OF INSTRUCTIONAL MATERIAL THEREFOR" (RO997-090). This application is also related to the following co-pending applications which were filed on Dec. 15, 1997 by George Francis DeStefano: U.S. Ser. No. 08/990,370 entitled "COMPUTER SYSTEM AND METHOD OF MANIPULATING A WINDOW ON A COMPUTER DISPLAY THROUGH COLLISION WITH A POINTER" (RO997-005); (now issued as U.S. Pat. No. 6,091,395 U.S. Ser. No. 08/990,304 entitled "COMPUTER SYSTEM AND METHOD OF MANIPULATING MULTIPLE GRAPHICAL USER INTERFACE COMPONENTS ON A COMPUTER DISPLAY WITH A PROXIMITY POINTER" (RO997-041) (now issued as U.S. Pat. No. 6,075,531). Each of these applications is hereby incorporated by reference herein.

FIELD OF THE INVENTION

The invention is generally related to computer systems and graphical user interface environments therefor. More particularly, the invention is related to display and user access to information in a computer system or the like.

BACKGROUND OF THE INVENTION

The human communication process has evolved over thousands of years to principally include both spoken and written communication. In addition, over time much of the combined knowledge base of the world has been recorded in written form (e.g., in books), so that others are able to more conveniently access and use such information.

With the advent of computer technology, more and more information is stored in an electronic form and accessed via a computer, rather than via the written page. Nonetheless, throughout the evolution of human communication, information has always be regarded as being essentially one-dimensional—that is, a series of ideas strung together in a sequence of words or pages. Book pages and computer displays are each two-dimensional in nature, and may even provide two dimensional representations of three-dimensional objects. However, the basic structure of a collection of information presented in either case is still for the most part one-dimensional insofar as a person processes the information in a generally linear fashion.

A specific type of collection of information is a collection of chronologically-arranged information. For example, a literary work such as a fictional story or non-fictional account of events includes information that is generally indexable along a time line. Similarly, explanations of methods or processes may be indexable along a relative time line, e.g., where step A is performed, then step B is performed, etc. Due to these chronological arrangements, such information is naturally processed linearly in most circumstances.

A one-dimensional representation of information may be adequate for some when the amount of information is not that great. However, a person may have difficulty fully comprehending a collection of information about a particular topic when the information is located in several sources and/or when the information is associated with several levels of abstraction.

A level of abstraction typically relates to a particular manner of looking at a given collection of information, also referred to as a body of knowledge. Among other criteria, different levels of abstraction may relate to different comprehension levels, e.g., a basic or summary level vs. an advanced level, or different points of view or ways of looking at or stratifying the information. For example, a historical event may be told from different perspectives, e.g., from different witnesses to the event.

When accessing such information, however, a person may be required to manage and understand a number of levels of abstraction at the same time. However, since both books and computers typically require a person to access information from one source, and/or from one level of abstraction, at a time, the person may be forced to plod through information in a linear fashion and without the ability to visualize the relationship of the information in the broader scope of the body of knowledge. Continuing with the example of a learning about a historical event, a person may be required to manage and understand the accounts of the same events by different witnesses, but only by reviewing each witness account in sequence. The specific facts in previously-reviewed accounts may become lost or confused when facts regarding the same events as told by later witnesses are reviewed.

Furthermore, in the instances where a person is able to access information from more than one source or level of abstraction, the information is often provided in disjointed views, offering no opportunity for a person to visualize the interaction of information from different levels and/or sources. When accessing books, a person may review different books related to a given topic, or may review different sections or chapters within the same book. Even though a person can open two books at the same time, the person still is required to shift his or her focus back and forth between the books, and between different pages in those books. As a result, the person is required to consciously recognize and maintain any associations in the information.

Many of the same difficulties associated with accessing and authoring information in book form are also associated with information in electronic form. Many computer systems, for example, use graphical user interfaces (GUIs) through which users are able to interact with the computer systems through intuitive operations such as "pointing and clicking" on graphical display elements. Information is often presented to a user in a GUI environment using a graphical user interface component known as a window. Each computer software application executing in a GUI environment is typically allocated one or more windows to present information to and/or receive input from a user. Moreover, a number of computer systems provide the ability to multitask—that is, to execute more than one computer software application at the same time—such that windows from multiple applications may be displayed on a computer display simultaneously.

While information from more than one source or level of abstraction for a body of knowledge may be displayed simultaneously in different windows on a computer system, the relationship between the information displayed in the different windows, as well as the relationship of the information within the broader scope of the body of knowledge, is often not readily discernable by a user. As a result, it can become difficult for a user to manage the information in a coherent manner. Switching between different formats and views can become disorienting and distracting, often significantly impeding the learning process.

Therefore, a significant need exists for an improved manner of representing a collection of chronologically-arranged information in a computer system to facilitate user understanding and comprehension.

SUMMARY OF THE INVENTION

The invention addresses these and other problems associated with the prior art in providing in one aspect a computer system and method in which multiple development threads represented by a collection of chronologically-arranged information are concurrently displayed. As a result, the contextual relationship of such development threads is maintained to facilitate user comprehension and management of the collection of chronologically-arranged information as a whole.

Various embodiments of the invention utilize an abstraction stack to access a body of knowledge stratified into a plurality of levels of abstraction and including a plurality of information elements associated with the plurality of levels of abstraction and organized generally chronologically in the body of knowledge. The abstraction stack concurrently displays first and second representations of a common portion of the body of knowledge, with the first and second representations respectively displaying first and second information elements respectively associated with first and second levels of abstraction. The first and second levels of abstraction are respectively associated with separate development threads such that such threads are concurrently presented to a user.

Development threads, which present alternate representations of a sequence of events, may be defined in a number of manners, including but not limited to different points of view, perspectives, writing styles, levels of comprehension and levels of detail. Moreover, further stratification of a body of knowledge may be performed to define additional abstraction schemes for the body of knowledge such that multiple representations of each development thread may be concurrently presented.

The invention also provides in another aspect a computer system and method in which information stratified using multiple abstraction schemes is concurrently displayed. Each abstraction scheme stratifies a collection of information into a plurality of levels of abstraction, with at least a portion of a plurality of information elements therefrom associated with levels of abstraction from one or more of the abstraction schemes. Various information elements may then be concurrently displayed in such a manner that the relationship of the information elements in terms of the multiple abstraction schemes may be presented to a user.

Using multiple abstraction schemes enables a greater deal of flexibility insofar as more than one contextual or hierarchical stratification of information may be concurrently presented to a user. As a result, it is often possible to further enhance a user's comprehension of a collection of information through the presentation of additional contextual relationships associated with the information.

These and other advantages and features, which characterize the invention, are set forth in the claims annexed hereto and forming a further part hereof. However, for a better understanding of the invention, and of the advantages and objectives attained through its use, reference should be made to the Drawing, and to the accompanying descriptive matter, in which there is described exemplary embodiments of the invention.

DETAILED DESCRIPTION

The embodiments of the invention described hereinafter utilize an abstraction stack to represent information from a body of knowledge (BOK) stratified into a plurality of levels of abstraction. The specific details regarding the construction, implementation, and use of an abstraction stack are generally disclosed in the herein incorporated applications entitled "COMPUTER SYSTEM AND METHOD FOR AUTHORING, ABSTRACTING AND ACCESSING A BODY OF KNOWLEDGE" and "COMPUTER SYSTEM, METHOD AND USER INTERFACE COMPONENTS FOR ABSTRACTING AND ACCESSING A BODY OF KNOWLEDGE". The reader is therefore directed to these applications for a more detailed understanding of the specific components discussed herein.

Prior to describing preferred embodiments of the invention, a brief discussion of exemplary hardware and software environments will be presented.

Hardware Environment

Figure 1:
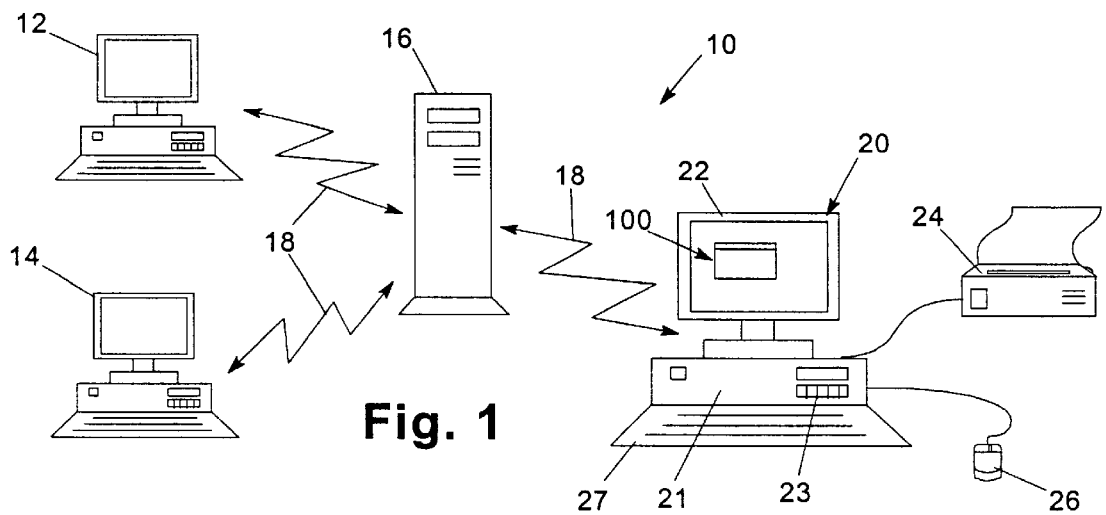
FIG. 1 is a block diagram of a computer system consistent with the invention.

Turning to the Drawing, wherein like numbers denote like parts throughout the several views, a computer system 10 consistent with the invention is illustrated in FIG. 1. Computer system 10 is illustrated as a networked computer system including one or more client computer systems 12, 14 and 20 (e.g., desktop or personal computers, workstations, etc.) coupled to server system 16 through a network 18. Network 18 may represent practically any type of networked interconnection, including but not limited to local-area, wide-area, wireless, and public networks (e.g., the Internet). Moreover, any number of computers and other devices may be networked through network 18, e.g., multiple servers. Furthermore, it should be appreciated that the principles of the invention may be utilized as well by stand-alone computers and associated devices consistent with the invention.

Computer system 20, which may be similar to computer systems 12, 14, may include a processor such as a microprocessor 21; a number of peripheral components such as a computer display 22; storage devices 23 such as hard, floppy, and/or CD-ROM disk drives; a printer 24; and various input devices (e.g., a mouse 26 and keyboard 27), among others. Computer system 20 operates under the control of an operating system, and executes various computer software applications, programs, objects, modules, etc. Moreover, various applications, programs, objects, modules, etc. may also execute on one or more processors in server 16 or other computer systems 12, 14, e.g., in a distributed computing environment.

Computer display 22 may include any known manner of visually presenting information to a user. For example, computer display 22 may be a video monitor, e.g., a cathode-ray tube (CRT), a liquid crystal display (LCD), or a projection display, among others. In addition, other types of computer displays, including two dimensional displays that simulate three dimensions (e.g., virtual reality headsets), as well as three dimensional displays such as holographic tanks and the like, may also be used.

User input may also be received from other known user input devices. For example, control of a pointer on a display may be handled by a trackball, a joystick, a light pen, a touch sensitive pad or display, a digitizing tablet, and a keyboard, among others. In addition, many of such devices include one or more user controls such as buttons, thumb wheels, sliders and the like. Moreover, voice and/or image recognition may be used to permit a user to provide voice commands and/or gestures to provide user input to a computer system. Other user interface devices may also be used in the alternative.

In general, the routines executed to implement the illustrated embodiments of the invention, whether implemented as part of an operating system or a specific application, program, object, module or sequence of instructions will be referred to herein as "computer programs". The computer programs typically comprise instructions which, when read and executed by one or more processors in the devices or systems in networked computer system 10, cause those devices or systems to perform the steps necessary to execute steps or elements embodying the various aspects of the invention. Moreover, while the invention has and hereinafter will be described in the context of fully functioning computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and non-volatile memory devices, floppy disks, hard disk drives, CD-ROM's, DVD's, and transmission type media such as digital and analog communications links.

Those skilled in the art will recognize that the exemplary environment illustrated in FIG. 1 is not intended to limit the present invention. Indeed, those skilled in the art will recognize that other alternative hardware environments may be used without departing from the scope of the present invention.

Software Environment

Figure 2:
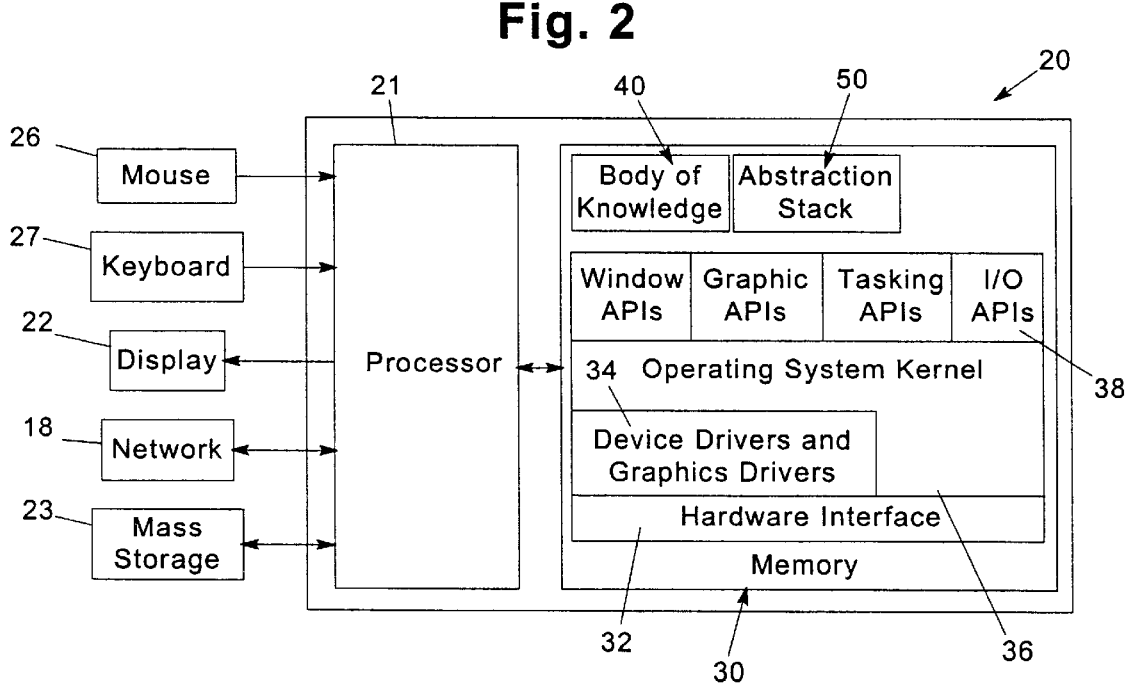
FIG. 2 is a block diagram of an exemplary software environment for the computer system of FIG. 1.

FIG. 2 illustrates one suitable software environment for computer system 20 consistent with the invention. A processor 21 is illustrated as coupled to a memory 30 as well as to several inputs and outputs. For example, user input is received by processor 21, e.g., by mouse 26 and keyboard 27, among others. Additional information may be passed between computer system 20 and other computer systems in networked computer system 10 via network 18. Additional information may be stored to and/or received from mass storage 23. Processor 21 also outputs display data to display 22. It should be appreciated that computer system 20 includes suitable interfaces between processor 21 and each of components 18, 22, 23, 26, 27 and 28 as is well known in the art.

A number of system computer programs are stored in memory 30, including hardware interface program code 32, device and graphics drivers 34, operating system kernel 36, and various application programming interfaces (APIs) 38, e.g., Window APIs, Graphic APIs, Tasking APIs and Input/Output APIs, among others. It should be appreciated that the configuration and operation of each of these system programs typically depends upon the particular computer hardware used, and is in general well understood in the art. For example, any of a number of operating systems may be used, e.g., OS/400 for the AS/400 midrange computer, Windows 95 or Windows NT for a PC system, MacOS for the Macintosh computer, or any of the number of variations of UNIX, among others.

Any number of computer software applications may execute on computer system 10 by utilizing the system program code provided therein. Moreover, memory 30 may also store data utilized by various applications or system program code. For example, FIG. 2 illustrates a body of knowledge 40 and an abstraction stack 50, each of which are discussed in greater detail below.

It should be appreciated that the system program code represented at 32–38, body of knowledge 40, and abstraction stack 50 may be stored on network 18 or mass storage 23 prior to start-up. In addition, each may have various components that are resident at different times in any of memory 30, mass storage 23, network 18, or within registers and/or caches in processor 21 (e.g., during execution thereof).

It should also be appreciated that other software environments may be utilized in the alternative.

Abstraction of Chronologically-Arranged information

Figure 3:
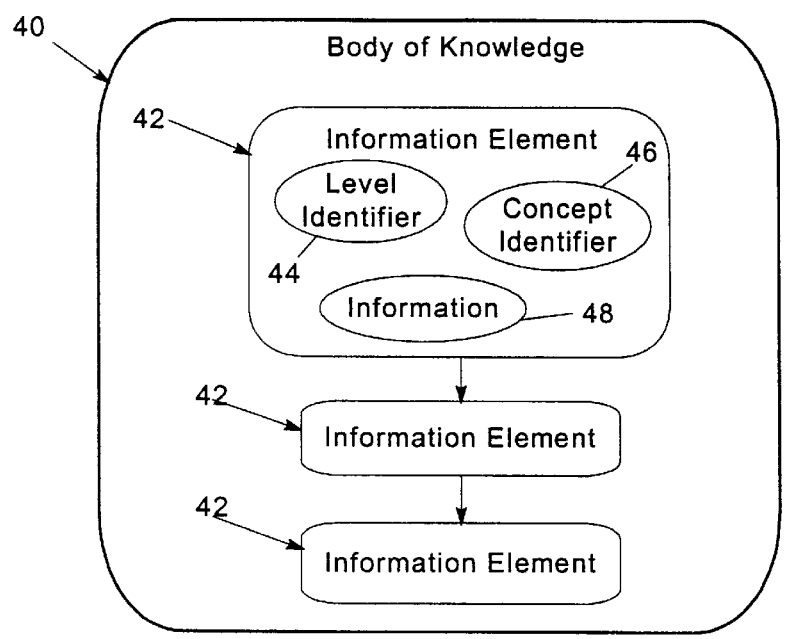
FIG. 3 is a block diagram of the software components in the body of knowledge of FIG. 2.

Information to be accessed by an abstraction stack typically must first be abstracted into the form of a body of knowledge. For example, FIG. 3 illustrates one manner of maintaining a body of knowledge 40 that utilizes an ordered list of information elements 42.

An information element typically represents a segment of data that conveys information related to one or more levels of abstraction in a body of knowledge. The information elements are generally arranged chronologically, although it should be appreciated that a general chronological arrangement may include arrangements in which different chronological threads are interleaved with one another, e.g,. with information elements associated with different levels of abstraction interleaved with one another in various fashions. For example, it may be desirable to group together information elements related to the same point along a timeline, but which are associated with different levels of abstraction. Moreover, the chronological arrangement typically relates to the manner in which information elements are presented for viewing, rather than the manner in which they are stored, since practically any known data structure may be used to store a body of knowledge. Moreover, only a portion of the information elements in a body of knowledge may be chronologically-arranged. In general, due to the often amorphous nature of a body of knowledge, any number of arrangements may be considered to be at least in part chronologically-arranged.

Each information element includes a level identifier 44, a concept element identifier 46 and information 48. Level identifier 44 generally represents an author's designation of which if any levels of abstraction are related to the information in the information element, and thus, whether the information element is suitable for presentation in conjunction with the presentation of a particular level of abstraction. The level identifier can have a number of possible values, including a null value, a single level value, a list of level values, a range of level values, a list of ranges of level values, an upper level boundary, a lower level boundary, or any combination thereof.

A level of abstraction typically represents a particular manner of looking at a given body of knowledge. For example, for collections of chronologically-arranged information, different bodies of knowledge may be contemplated, e.g., literary works such as fictional or non-fictional works, novels, historical works, screen plays, scripts, plays, short stories, bible stories, biographies, news reports, etc. A body of knowledge may also be directed generally to "how" something has or does occur, e.g., explaining what happened, how things came to be, or how to make things come about. In addition to literary works, which also often fall within this categorization, other bodies of knowledge may include how-to books, reference materials, planning and/or project management tools such as personal information managers, recipe books, authoring systems, control systems, help systems, etc.

Levels of abstraction may principally be defined in one aspect for different development threads, which may also have the ability to converge or diverge to and from one another via the association of information elements with more than one level of abstraction. A development thread is a particular representation of a sequence of events, e.g., as told from a particular perspective. For example, different story lines may be presented in different levels of abstraction, which could even provide the possibility of multiple endings to a literary work. In addition, suitable levels of abstraction may be defined for separate points of view, e.g., the views of different characters in a story or witnesses to an event, or different philosophies, religions, attitudes, political views, etc. In addition, levels of abstraction may be defined for different "persons", styles of writing such as first-person, second-person, or third-person, or for different levels of comprehension (e.g., elementary, high school, undergraduate, Ph.D., novice, expert, etc.), or different levels of detail (e.g., summary, overview, detailed, etc.).

Moreover, multiple abstraction schemes may be supported, whereby an information element may include multiple level identifiers to represent different stratifications of the body of knowledge. As a result, a body of knowledge for chronologically-arranged information may also be stratified via a separate scheme based upon any of the other abstraction schemes described in any of the aforementioned incorporated applications. Generally, any abstraction stack may often be considered as addressing audiences with multiple levels of ability and interest. The audiences in some instances are made up of separate individuals. In other instances, a single individual's ability and interest can vary over time so that a single individual represents multiple audiences. As a result, the manner in which additional levels of abstraction are established for a body of knowledge can determine how different presentations can be tailored to specific audiences.

Consequently, the additional levels of abstraction assigned to a given chronologically-arranged body of knowledge may be based on numerous criteria. For example, additional levels of abstraction may be defined for different communication tools or techniques for explaining a given topic (e.g., definitions, summaries, overviews, frequently asked questions (FAQ's), glossary terms, related topics, detailed explanations, formulas, illustrations, examples, tutorials, etc.) Levels of abstraction may also be broken up based upon different sections, or components, of a document (e.g., executive overview, preface, introduction, table of contents, headings, main body, footnote, summary, appendix, index, glossary, etc.) Levels of abstraction may also be distinguished based upon the type of data (e.g., text data, image data, audio data, video data, executable data, etc.) Levels of abstraction may also look at a body of knowledge from different perspectives, e.g., "what", "why", "how", "when", etc. For computer program code, different software components and/or layers may be defined, e.g., source code, object code, library, interface, framework, object or class definition, comment, etc. Other levels of abstraction may be defined to distinguish a work from comments thereon (such as analysis and critiques thereof), e.g., for literary interpretation of an author's collective works., or to distinguish the text and illustrations of a work, for example. Other manners of distinguishing levels of abstraction may also be used in the alternative.

Concept identifier 46 generally represents an author's identification of an information element in terms of one or more named concepts. The concept identifier may be used to associate the presentation of a concept at one level of abstraction with those of other levels, as information elements related to the same concept but from different levels will have the same concept identifier. In the context of chronologically-arranged information elements, a concept identifier typically may represent a particular segment along a timeline, or a particular event or step in a process. The concept identifier can have any suitable value, e.g., a combination of alphanumeric characters, that provides a unique identification for a particular named concept. In addition, the concept identifier can be null to indicate a lack of association with a particular named concept. For chronologically-arranged information, a concept identifier may be associated with an absolute or relative time or date. In the alternative, an inherent concept identifier for each information element may be defined by virtue of the organization of information elements within the body of knowledge (e.g., information element A precedes information element B in chronological sequence because it precedes information element B in the data structure), whereby no additional concept identifier would be required.

Information 48 generally represents the actual data in the information element that is relevant to the body of knowledge. The information may be as small as a bit (e.g., a flag), or may include an unlimited amount and variety of data, including text data, image data, multimedia data such as audio and/or video data, executable data, etc. Information 48 may also include other information elements, whereby nested information elements are supported.

Abstraction Stack

Figure 5:
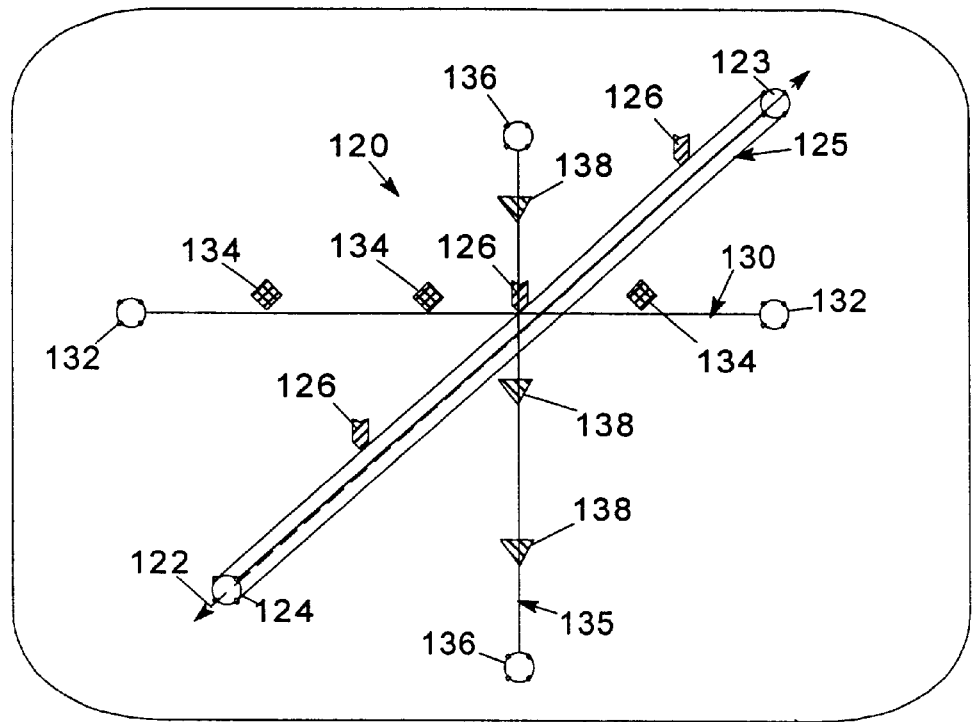
FIG. 5 is a block diagram of a multi-scheme abstraction stack utilizing multiple abstraction axes.

As discussed above, an abstraction stack is utilized to access and/or manipulate the information stored in a body of knowledge, e.g., body of knowledge 40. A wide variety of user interface actions, components, and controls, outlined in more detail in the aforementioned herein incorporated applications, may be utilized in accessing and/or modifying information presented in an abstraction stack. FIG. 5, for example, illustrates an exemplary abstraction stack 100.

An abstraction stack generally provides a visual manner of organizing multiple levels of abstraction. Each level of abstraction in a body of knowledge is typically represented in an abstraction stack by a focal plane organized along a common depth vector 102, or abstraction axis, extending generally perpendicular thereto. The focal planes are organized along depth vector 102 based upon the manner of categorizing the levels of abstraction. For example, if levels of abstraction relate to different levels of detail, the focal planes may be organized sequentially based upon the relative levels of detail for their associated levels of abstraction.

An abstraction stack functions to display information from one or more focal planes in such a manner that the different focal planes are organized in a three-dimensional workspace such that the relative arrangement of the focal planes is readily apparent therefrom. Focal planes are generally handled as two-dimensional virtual constructs, with the depth vector upon which focal planes are organized representing the third dimension of the stack. As a result, display of an abstraction stack on a two-dimensional display such as a video monitor often requires three-dimensional modeling techniques to be utilized to provide a three-dimensional rendering of an abstraction stack. It should be appreciated that depth vector 102 is principally an organizational construct, and may or may not be displayed on a computer display.

One type of object forming the data structure of the abstraction stack is a lens, e.g., lenses 110, 112 and 114, which typically serves as a point of attachment and focus point along the abstraction stack for stack manipulation and content. A lens is typically used to display the information from one or more levels of abstraction. In addition, a lens is typically represented in much the same manner as a GUI window, with controls such as resizing handles, minimizing handles, scroll bars, etc. used to modify the appearance and content displayed in the lens.

Another type of abstraction stack object data structure is a compass handle (e.g., handles 103 and 104), which are typically located at an end of a depth vector of an abstraction stack. A compass handle typically functions as an endpoint of the abstraction stack, and may function as a focal point for manipulation of and access to a minimized or maximized abstraction stack. In addition, a compass handle may be used as a point of attachment to other related abstraction stacks for a particular body of knowledge.

Another object in the abstraction stack data structure is a binder band, which provides one manner of visually representing the hierarchical arrangement of levels of abstraction via visually connecting other objects displayed along a depth vector of an abstraction stack. One subclass of a binder band is a shaft band (e.g., shaft band 105), which generally links together objects associated with different levels of abstraction in a body of knowledge. Another subclass of a binder band is a strata band (e.g., strata band 116), which generally links together objects associated with the same level of abstraction in a body of knowledge. A binder band is typically represented by one or more connecting elements that extend between two other displayed objects. For example, in one embodiment, a binder band may be represented by four lines extending between corresponding corners of two objects (e.g., lines 105a–d for binder band 105). Other numbers of lines, as well as other forms of connecting elements, may be used to represent a binder band in the alternative.

One additional abstraction stack object is an intersection point (e.g., intersection point 106), which principally functions to identify a single focal plane (representing a single level of abstraction) along the length of a depth vector. The intersection point typically may be manipulated by a user to create a lens associated with the focal plane for the intersection point. It also may be desirable in some applications to hide selected intersection points on the display, e.g., in response to the creation of lenses that display information from the levels of abstraction associated with such intersection points.

Lenses, which are much like windows in common GUI environments, may be created and manipulated to modify the presentation of information from a body of knowledge. Lenses differ from windows, however, in that multiple lenses may be related to one another through predetermined relationships. For example, lenses may be related through a coordinated scrolling relationship, whereby multiple lenses may be coordinated to display different views of essentially the same concepts in a body of knowledge, with coordinated scrolling provided to ensure that the lenses track one another as lenses are scrolled to display other concepts in a body of knowledge. To this extent, lenses in an abstraction stack are typically grouped into one or more lens sets. Each lens set typically has associated therewith a current location or position in the body of knowledge that is consistent across each lens in the lens set. Each lens, however, may also have start and end boundaries, referred to herein as shallow and deep bounds, that define at the extent of a "window" or segment of information from the body of knowledge that is displayed in a particular lens. By maintaining the current position for the lens set between the shallow and deep bounds of each lens in the lens set, the lenses are permitted to track one another during scrolling operations.

Lenses in a coordinated scrolling lens set are typically, but not necessarily, disposed along the depth vector and connected by shaft bands such as shaft bands 105. Lenses that are disposed along a depth vector may be considered as depth vector lenses, and are typically either primary or secondary lenses. Primary and secondary lenses are associated in a common lens set, with the only difference therebetween being that a primary lens is the focus of a user's interaction with the abstraction stack in navigation of the body of knowledge, while a secondary lens is typically modified automatically in response to user operations on the primary lens. A secondary lens typically displays the same concepts as a primary lens, albeit with an independent filter configuration that provides an alternate view of essentially the same information in the body of knowledge. In addition, a secondary lens may be activated to become the primary lens, whereby the prior primary lens then becomes a secondary lens. As an example, lens 110 and lens 112 form a lens set, with either designated as the primary or secondary lens therefor depending upon which receives user input.

Lenses may also be related through an inherited filter relationship, whereby one lens, designated a supplementary lens, inherits the filter characteristics of another lens, designated a supplemented lens. A supplementary lens (e.g., lens 114) provides a view of information at an alternate point within the body of knowledge to that of the lens supplemented thereby. Navigation with a supplementary lens is independent of its supplemented lens, although the filter configuration is typically identical to that of its supplemented lens.

Supplementary lenses are typically disposed at the same depth along the depth vector as their associated supplemented lens, but spaced apart from the supplemented lens within the same plane. A connector element such as a strata band 116 may be used to visually link a supplementary lens with its supplemented lens. Supplementary lenses may also be members of a lens set of other supplementary lenses such that a coordinated scrolling relationship is provided therebetween.

Therefore, it may be seen that any given lens may be distinguished as being a primary or secondary lens, depending upon whether the lens is the focus of user input, as well as being a supplemented (depth vector) lens or being a supplementary (offset from depth vector) lens.

Each lens also has associated therewith a filter that defines how the lens displays information from the body of knowledge. Specifically, a filter for a lens typically defines whether a lens passes or blocks information elements from each level of abstraction. In addition, for each level of abstraction passed by the filter, the filter defines how the information elements therefrom are transformed, if at all, when displayed in the lens.

The types of filters that may be useful in an abstraction stack typically varies depending upon the manner in which a body of knowledge is stratified into levels of abstraction, which may be referred to as an abstraction scheme. A body of knowledge may be represented by one abstraction scheme or by multiple abstraction schemes, with one or more of such schemes specifically defined by an author or developer, and/or with one or more of such schemes inherently defined, e.g., based upon standard document components or data types.

For example, for abstraction levels defined in terms of development threads such as points of view, filters may be established to pass accounts of events from different witnesses to an event or characters in a story. Filters may also be defined to provide for different writing styles, event sequences, levels of comprehension, data types, document components, communications techniques, comments, critiques, and analysis of a body of work, etc. Other filter configurations suitable for presenting different views of different bodies of knowledge should be apparent to one of ordinary skill in the art.

Moreover, as multiple abstraction schemes—that is, multiple stratifications of levels of abstraction—may also be supported, a filter configuration may also select how to handle levels of abstraction from multiple abstraction schemes. Typically, this would be performed by having separate filter configurations for each scheme.

A body of knowledge stratified into multiple abstraction schemes may be presented in a number of ways. Generally, one abstraction scheme will be represented by varying depths along a primary abstraction axis of a stack, with other abstraction schemes defined on parallel stacks, or in the alternative, as extending along separate secondary axes (e.g., orthogonal) to the primary abstraction axis, or simply existing in the same plane along the primary axis.

For example, FIG. 5 illustrates a multi-scheme abstraction stack 120 that utilizes multiple orthogonal abstraction axes. An abstraction axis 122 is utilized to represent stratification according to a first abstraction scheme. The first abstraction scheme includes a first plurality of levels of abstraction, illustrated in FIG. 5 by intersection points 126 spaced between compass handles 123 and 124 and joined via binder bands 125. Another abstraction axis 130 is oriented orthogonal to axis 122 in the three dimensional workspace and is represented by a line segment extending between a pair of compass handles 132. Axis 130 represents a second abstraction scheme that includes a plurality of levels represented by intersection points 134. Similarly, another abstraction axis 135 is oriented orthogonal to both of axes 122 and 130 in the three dimensional workspace and is represented by a line segment extending between a pair of compass handles 136. Axis 135 represents a third abstraction scheme that includes a plurality of levels represented by intersection points 138. It should be appreciated that the number of axes and the relative orientation therebetween may be modified consistent with the invention.

Figure 6:
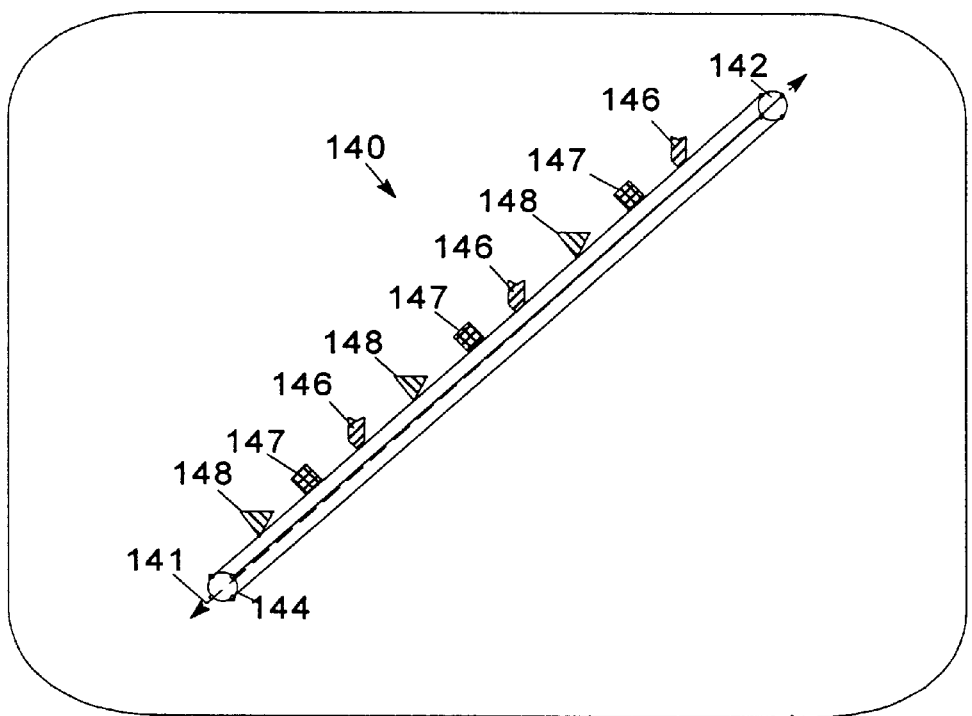
FIG. 6 is a block diagram of a multi-scheme abstraction stack utilizing a single integrated abstraction axis.

As another alternative, different abstraction schemes may be represented along a single abstraction axis, with the different abstraction schemes visually distinguished by the appearance of the intersection points associated therewith. For example, as shown in FIG. 6, a multi-scheme abstraction stack 140 may include a single integrated abstraction axis 141 terminated by a pair of compass handles 142, 144. The levels of abstraction in a first abstraction scheme may be represented by a plurality of intersection points 146 having a first appearance. Similarly, the levels of abstraction in second and third abstraction schemes may be represented by separate groups of intersections points, e.g., intersection points 147 and 148, respectively, which also have distinct appearances to indicate their association with a particular abstraction scheme.

Figure 10:
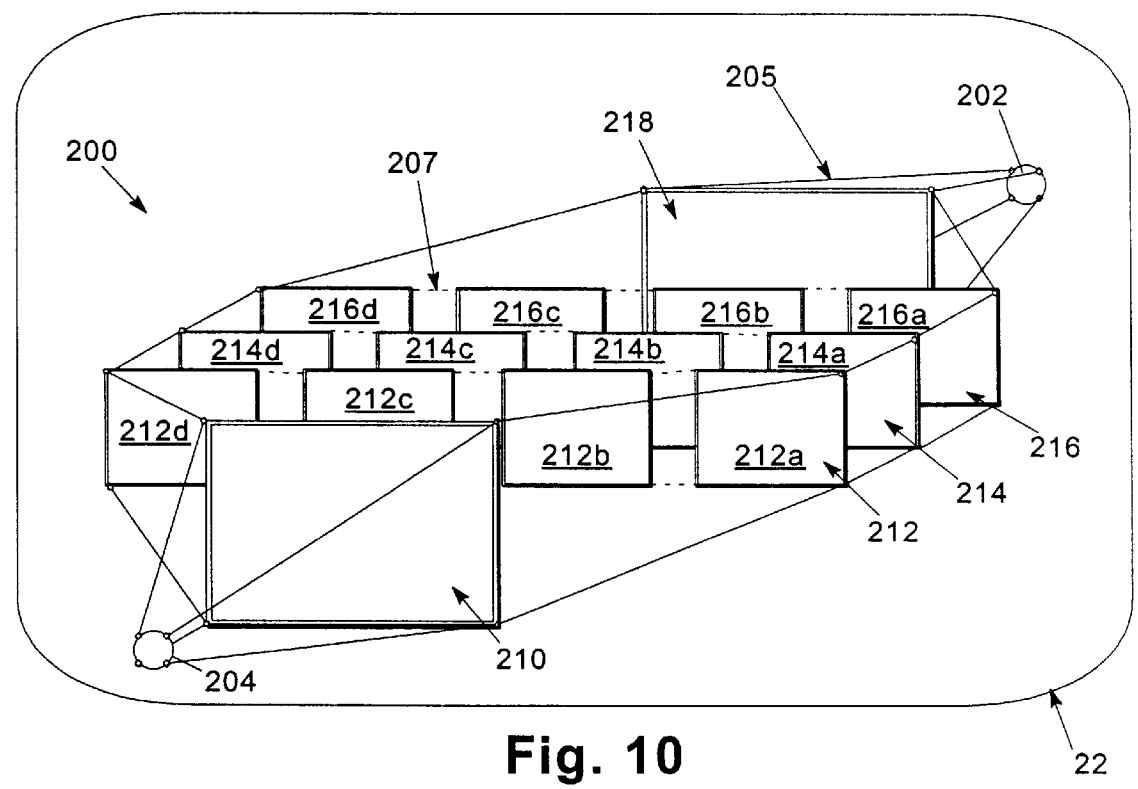
FIG. 10 is a block diagram of yet another storytelling abstraction stack consistent with the invention, including a plurality of co-supplemental lens groups representing a second abstraction scheme.

When multiple lenses are disposed either along a secondary axis or within the same plane, and are associated with the same depth along the primary axis, the lenses may be defined as forming a co-supplemental lens group since the lenses typically do not define a supplemental/supplemented relationship as described above. Moreover, while such lenses typically inherit the same filter configuration for the first abstraction scheme, each lens may be distinguished via the filter configuration applied to the levels of abstraction defined for the secondary abstraction scheme. In such instances, it may be desirable to define a lens group object along the depth vector, whereby user manipulations on the lens group as a whole are permitted. Furthermore, binder bands may be anchored to various points along the boundary of a lens group so that such lens groups are visually distinguished to a user (see, e.g., any of lens groups 212, 214, or 216 in abstraction stack 200 of FIG. 10). In addition, a coordinated scrolling relationship is also typically provided between lenses in a co-supplemental lens group.

It may also be desirable to enable a user to control which abstraction scheme is designated the "primary" abstraction scheme for the body of knowledge, e.g., through clicking on an abstraction axis or other like user interface actions. Moreover, it may be desirable to enable a user to controllably modify the viewpoint for the abstraction stack (e.g., as in a VRML world) so that different abstraction schemes may be brought in and out of predominance in the presentation of information. Other appropriate user interface mechanisms should be apparent to one of ordinary skill in the art.

Various user manipulations of lenses may be performed. For example, as discussed above, it may be desirable to provide coordinated scrolling between lenses in a lens set. In addition, it may also be possible to link together information elements relating to named concepts, which is typically performed through the use of a link pointer. As discussed above, information elements may be associated with one another based upon their relative point in time, i.e., chronologically. Essentially, movement of a link pointer over an information element directed to a specific named concept results in the highlighting of other displayed information elements matching the named concept. Typically, but not necessarily, link pointer operation is limited to moving a pointer over an information element in the primary lens of a lens set, and is typically initiated in response to a "cross over" event as is known in the art.

Lenses and/or lens groups may also be represented in minimized or maximized representations. A minor lens typically is utilized to represent a minimized lens, and is typically arbitrarily small so that its minimized representation is apparent to a user. A maximized lens is typically represented by a prime lens, with a collapsed abstraction stack typically displayed concurrently with a prime lens to maintain a visual relationship of the prime lens within the abstraction stack as a whole.

Figure 4:
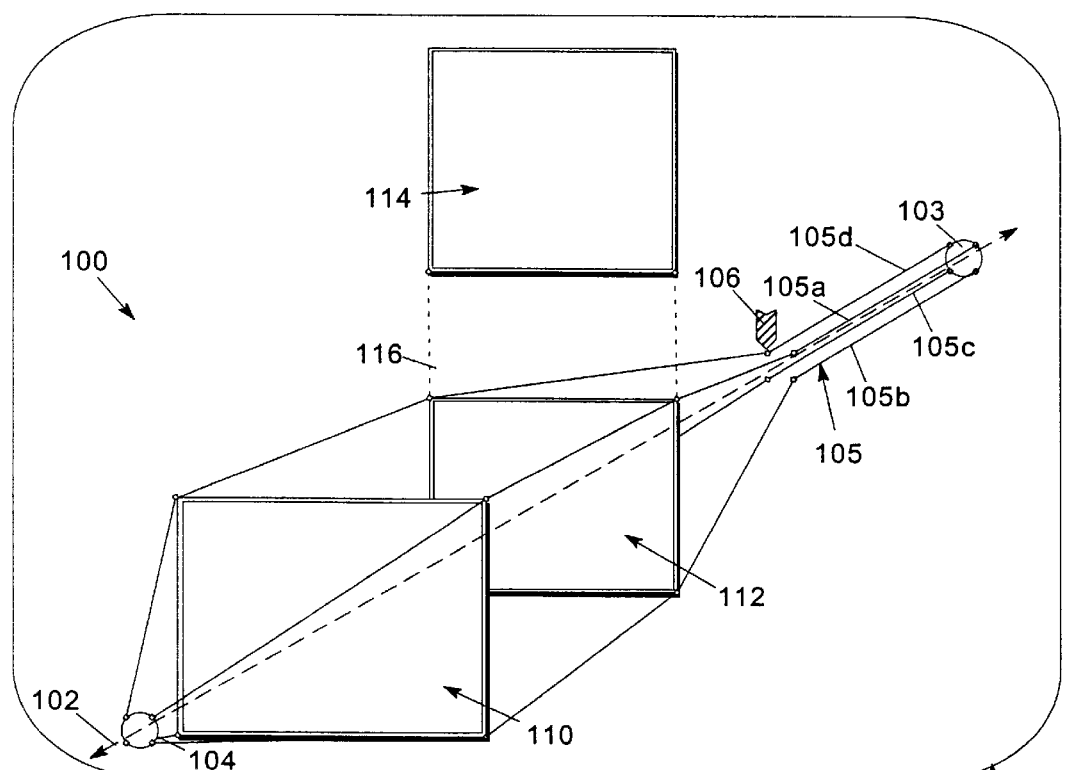
FIG. 4 is a block diagram of the software components in the abstraction stack of FIG. 2.

User interaction with the abstraction stack is principally handled by a pointer (not shown in FIG. 4) that is manipulated by one or more user interface devices such as a mouse, a trackball, a keyboard, a touch pad, etc. A pointer may be placed into one of several modes, and may also be used in such operations as switching focus between lenses, highlighting information for cut and paste operations, etc. Other uses of the pointer include various conventional pointer-based actions, such as resizing, moving, closing and similar window operations, selection of menu entries, and selection of buttons, among others.

Additional user interface controls and operations may be implemented in an abstraction stack consistent with the invention. For example, a lens may include various conventional GUI window controls such as a close button, a minimize button, a maximize button, a title bar, resizing handles, scroll bars, drop-down menus, toolbar buttons, etc. A user may also be permitted to select a binder band (e.g., through single or double-clicking on the binder band) to open any adjacent minor lenses thereto, as well as optionally close any other lenses in the lens set. Lenses may also be maximized (e.g., through selection of a maximize button thereon or double-clicking on the title bar thereof), resulting in the display being switched to a prime lens view where the lens substantially fills the computer display, with only a collapsed representation of the remainder of the abstraction stack displayed.

Individual lenses in an expanded abstraction stack may also be manipulated by a user as desired. For example, lenses may be selected to control which lens is designated the primary lens for receiving user input. In addition, movement and/or resizing of lenses may be performed. Movement or resizing of a lens in a lens group or set typically modifies only that lens, although group movement and resizing operations may also be supported. However, even when a lens is resized or moved, the location of the lens along the depth vector relative to other lenses is preferably maintained so that the contextual relationship therebetween is also maintained. The position along the depth vector for a lens may be varied, but preferably not in such a manner that a lens is permitted to switch relative positions with another lens on the stack.

Movement or resizing of a lens may be performed in a number of manners consistent with the invention. For example, similar to conventional GUI windows, a lens may be moved by dragging its title bar or by using arrow keys when in a predetermined mode. Resizing of a lens typically may be performed using conventional resizing handles (e.g., by dragging the boundaries of the lens).

More preferably, however, various alternate movement mechanisms may be used in addition to and/or in lieu of conventional mechanisms. One suitable manner of moving or resizing a lens is through collision of pointer with a boundary of the lens when the pointer is in a collision resizing or movement manipulation mode. With this feature, which is the subject of the aforementioned incorporated application entitled "COMPUTER SYSTEM AND METHOD OF MANIPULATING A WINDOW ON A COMPUTER DISPLAY THROUGH COLLISION WITH A POINTER", movement of a pointer along a first vector moves a boundary segment of a lens along a second vector if it is determined that the first vector intersects that boundary segment. In a movement mode, the boundary segment is moved in conjunction with all other boundary segments to effectively move the lens. In a resizing mode, other boundary segments remain fixed to effectively resize the lens. The pointer may be defined to have a single position from which the first vector extends, or in the alternative, a proximity range may be defined around the pointer, with a boundary thereof used to test for collisions with a boundary segment of a lens.

This type of pointer manipulation, which is also referred to as a "bumper-jumper" operation, typically results in the appearance of a pointer "bumping" or "pushing" a lens as the pointer collides with the lens. The mode can be selectively enabled or disabled, including a temporary enabling or disabling operation (e.g., by holding down a control key during pointer movement) that permits a user to quickly and selectively "bump" or "jump" over any given boundary as desired. In addition, collision may be selectively detected only when contacting a boundary segment from outside a lens, and/or only when contacting a boundary segment while within the boundary of a lens.

Another suitable manner of moving or resizing a lens that may be used in lieu of or in conjunction with collision manipulation is that of proximity manipulation, such as is described in detail in the aforementioned incorporated application entitled "COMPUTER SYSTEM AND METHOD OF MANIPULATING MULTIPLE GRAPHICAL USER INTERFACE COMPONENTS ON A COMPUTER DISPLAY WITH A PROXIMITY POINTER". When in a proximity manipulation mode, lenses within a predetermined proximity range disposed around a proximity pointer may be resized or moved as a group in response to user manipulation of the pointer, thereby permitting faster manipulation of multiple objects at once.

It should be appreciated that other variations disclosed in these aforementioned applications may also be implemented consistent with the invention. In addition, other manners of manipulating the lenses will be apparent to one of ordinary skill in the art. For example, given that a body of knowledge may be represented in a tag-delimited format such as HTML, it should also be appreciated that hypertext links and the like may be embedded in the body of knowledge such that a user can navigate to predetermined locations in the same or different lenses specified in the embedded links simply by selecting those links. Links may also be associated with particular locations in the body of knowledge, so that each lens in a lens set is scrolled in a coordinated fashion to display its particular representation of that location in the body of knowledge. Other user-coordinated operations may also be performed on the abstraction stack consistent with the invention.

ILLUSTRATIVE EXAMPLES

An abstraction stack may be used to present information from a large variety of chronologically-arranged information, and using one or more abstraction schemes to stratify the information for better user comprehension.

For example, an abstraction stack may be utilized as a storyteller that accesses a story having multiple development threads such as different event sequences, different points of view, etc. The ability to concurrently present such development threads facilitates the comprehension of complex events. For example, as a legal analysis tool, an abstraction stack provides the ability to concurrently present multiple witness accounts of an accident or crime, whereby a user would often be able to instantly detect and clearly illustrate consistencies and inconsistencies between different accounts.

Also, as a literary tool, an abstraction stack provides a unique approach to storytelling, where a user is able to jump back and forth between different threads (e.g., different characters' points of view) that are concurrently presented to the user. Unlike some conventional novels where chapters or sections may be used to tell a story from different perspectives, an abstraction stack would enable a user to maintain his or her place in the overall timeline of events in a story, and with complete flexibility in terms of the order in which different accounts are reviewed.

Moreover, using available filtering techniques, works such as screenplays and other stories may be filtered in various lenses to present only the dialog for a subset of characters in each lens. Such an application would likely be useful in assisting actors in learning their lines, as an actor would have the ability to simultaneously view his or her lines both separate from and integrated with the lines of other actors. Furthermore, highlighting may be utilized to distinguish the lines of different actors integrated into a single lens.

Figure 7:
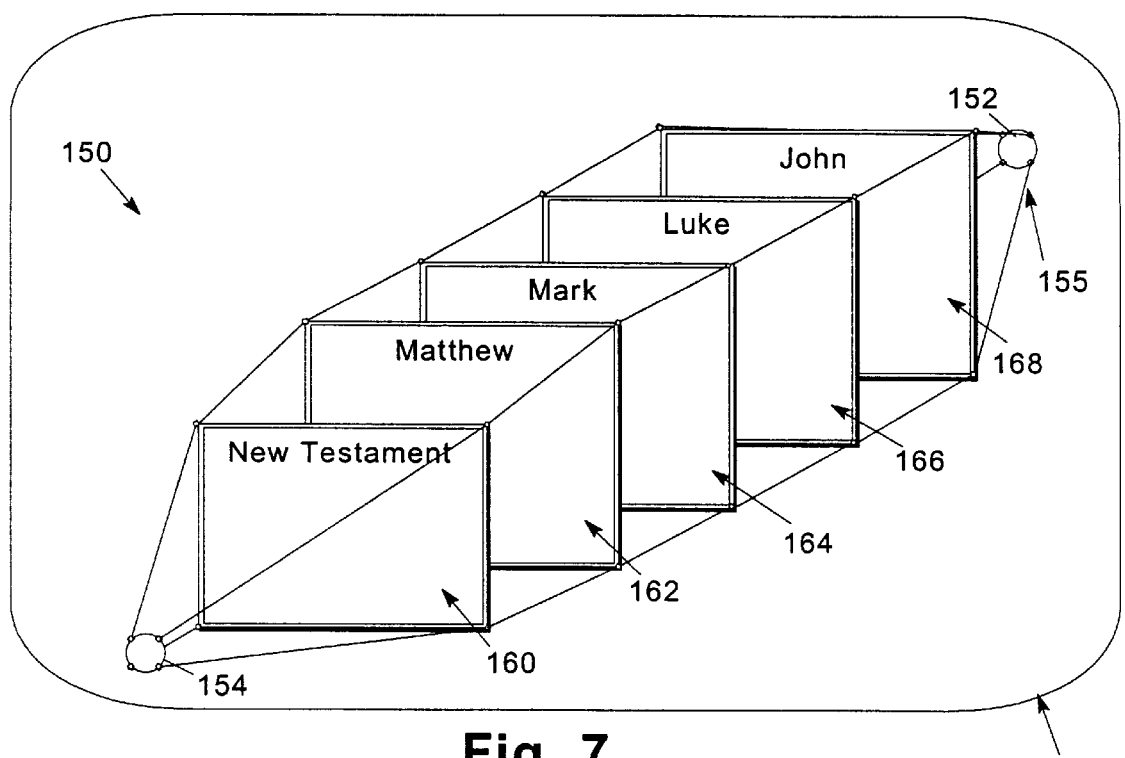
FIG. 7 is a block diagram of a storytelling abstraction stack consistent with the invention.

As one specific example of a storytelling application, the New Testament of the Bible could be represented as a body of knowledge and presented in an abstraction stack to concurrently present the story of the life of Jesus according to each of the gospels. A basic abstraction stack configuration suitable for this task is illustrated at 150 in FIG. 7. The body of knowledge in this application includes the entire text of the New Testament, with levels of abstraction defined for each gospel. Information elements may be defined, for example, for each verse or passage, with each information element associated with a gospel having a level identifier designating such. It may also be desirable to link information elements devoted to the same events with concept identifiers such that presentation of an event according to one gospel highlights the other gospels' presentation of the same event.

To present the New Testament in an abstraction stack representation, abstraction stack 150 includes a series of lenses 160–168 disposed between a pair of compass handles 152, 154 and joined by binder bands 155. A first lens 160 presents the New Testament in its entirety, with each of lenses 162, 164, 166 and 168 respectively presenting the gospels of Matthew, Mark, Luke and John. The filter configuration for lens 160 passes all levels of abstraction, optionally with information elements associated with each gospel visually distinguished, e.g., through separate fonts, styles, attributes, etc. Each lens 162–168 has a filter configuration that passes only the information elements associated with its associated gospel.

Figure 8:
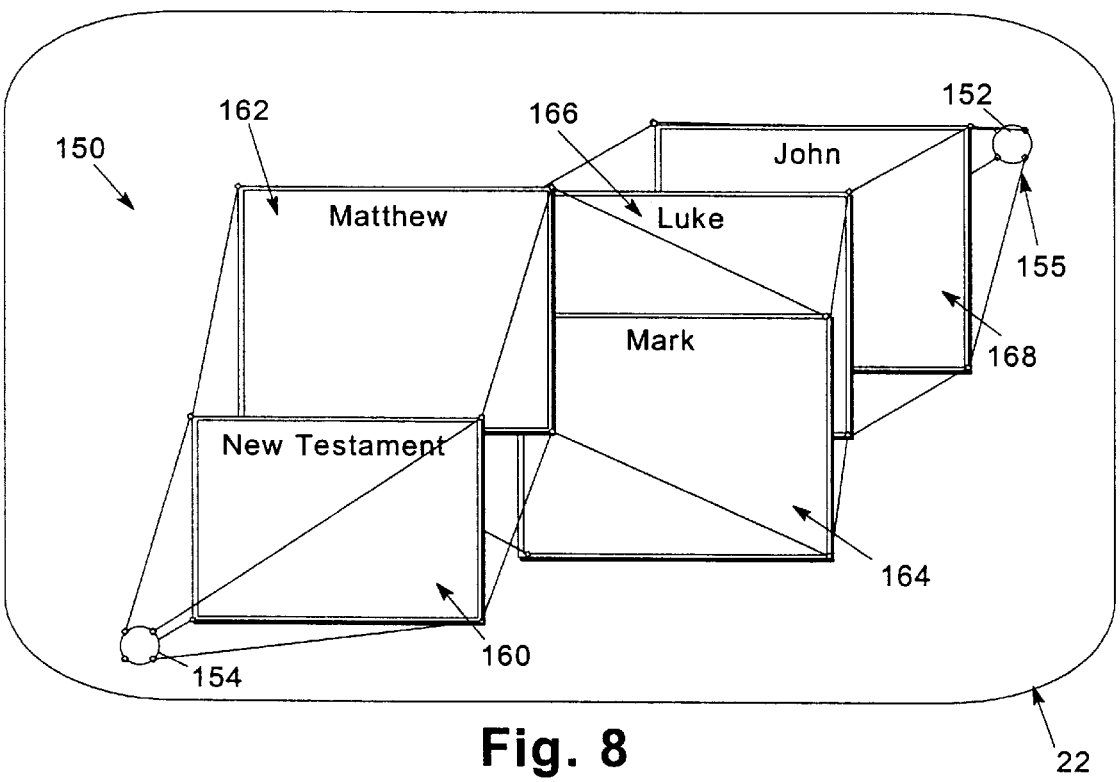
FIG. 8 is a block diagram of the abstraction stack of FIG. 7, showing movement of lenses within their focal planes.

It should be appreciated that user access and comprehension of the New Testament is greatly facilitated by abstraction stack 150. For example, a user may decide to primarily view lens 160, whereby through coordinated scrolling each lens 162–168 will constantly be updated with the various gospels' accounts of an event, so that a user can glance to each lens as desired to see the distinctions between each account. A user may also primarily study one gospels' account, while still being able to periodically track those of the other gospels. Moreover, it should be appreciated that through the lens movement capabilities described above for an abstraction stack consistent with the invention, each of the lenses may be shifted in a plane perpendicular to the abstraction axis to minimize the overlap therebetween, and while maintaining the same relative depth on the abstraction axis (see, e.g., lenses 162 and 164 in FIG. 8).

It may also be desirable to utilize multiple abstraction schemes to further stratify a body of knowledge. For example, document components may be used to distinguish outline topics or headings from verse, such that a topical outline or table of contents may be provided in a separate lens in the abstraction stack.

Figure 9:
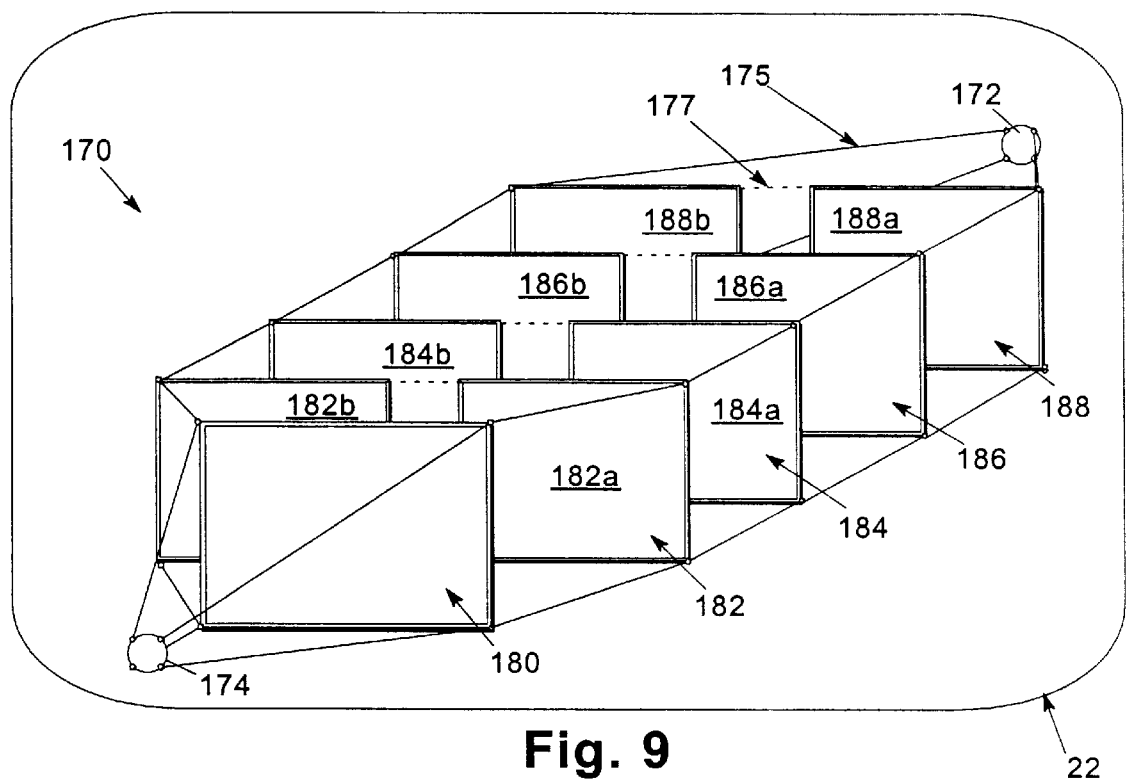
FIG. 9 is a block diagram of another storytelling abstraction stack consistent with the invention, including a plurality of co-supplemental lens groups representing a second abstraction scheme.

As another example, a first abstraction scheme for the body of knowledge for the New Testament may be the different gospels' accounts, with second abstraction scheme for stratifying information from the New Testament based on separate versions, e.g., an archetypical version and a canonical version. FIG. 9 illustrates one such abstraction stack 170 in which a plurality of co-supplemental lens groups 182–188 are disposed between a pair of compass handles 172, 174 and joined by binder bands 175. An additional lens 180 provides a topical index, outline or table of contents (which may utilize a third abstraction scheme based upon document components). Lens groups may also optionally be visually linked via connector elements such as strata bands 177.

Lens groups 182–188 are each stratified based upon gospel, with lens group 182 associated with Matthew, lens group 184 associated with Mark, lens group 186 associated with Luke and lens group 188 associated with John. Moreover, within each group are separate lenses associated with different versions of text. Each lens 182a, 184a, 186a and 188a may be associated with the archetypical version, with each lens 182b, 184b, 186b and 188b associated with the canonical version. As such, both versions of each gospel are presented side-by-side and in a coordinated scrolling arrangement, thereby facilitating a user's comprehension of both the content and context of each version, in addition to each gospel.

As another alternative, it may be desirable to utilize an abstraction scheme based upon gospel as a secondary abstraction scheme so that each gospel is presented side-by-side in a co-supplemental lens group. For example, a first abstraction scheme for the body of knowledge for the New Testament may stratify information based upon different versions of the Bible, e.g., a children's version, a "Living Bible" version, the King James version, etc. Additional levels may be based upon scholarly commentary on the moral principles represented in the gospel passages. Levels in a second abstraction scheme may then be defined for each gospel.

An exemplary abstraction stack representation as described above is shown in FIG. 10 as abstraction stack 200. A plurality of co-supplemental lens groups 212–216 are provided, representing the different versions of the Bible. For example, lens group 212 may be directed to a children's version, lens group 214 may be directed to a "living Bible" version, and lens group 216 may be directed to a "standard" version such as the King James version. The lens groups each include separate lenses representing each development thread—in this case, the gospels. As a result, the gospel of Matthew may be represented by lenses 212a, 214a and 216a, the gospel of Mark may be represented by lenses 212b, 214b and 216b, the gospel of Luke may be represented by lenses 212c, 214c and 216c, and the gospel of John may be represented by lenses 212d, 214d and 216d. The lenses in each lens group may also optionally be visually linked via connector elements such as strata bands 207.

Abstraction stack 200 may also include a lens 210 with a filter configuration that passes a topic outline, table of contents, or index, if desired. For example, lens 210 may provide a table that identifies each development thread (here, each gospel). Moreover, hypertext links within lens 210 may be used to open different lenses in a co-supplemental lens group, or to open different lens groups along the depth vector. An additional lens 218 may also be provided for scholarly commentary, if desired.

In this latter representation, it should be appreciated that the different developmental threads are presented as part of a co-supplemental lens group, which tends to reinforce the parallelism associated with these threads. The parallelism may also be emphasized by utilizing parallel stacks to represent different levels in the abstraction scheme. In the alternative, instead of utilizing a secondary abstraction scheme to stratify the different gospels, the entirety of each gospel could be presented sequentially in a body of knowledge such that supplemental lenses, which simply point to separate locations in the body of knowledge, could be used to concurrently present the different gospels using the same filter characteristics.

Yet another specific example of a storytelling abstraction stack application would be a presentation of a novel such as *The Sound and the Fury* by William Faulkner that tells the story of Cady Compson. The four sections of the novel could be represented as four threads, running together, and converging and diverging to tell a single story coordinated by sequence. In addition, the novel could be supplemented by a separate thread representing the Appendix. The threads may be represented as different levels in a primary or secondary abstraction scheme, whereby the threads would be represented by different depth vector lenses or by different lenses in a co-supplemental lens group. An additional abstraction scheme may be used to supplement the novel with a topical outline, a summation and/or commentary or criticism on structure, technique and origins.

One specific body of knowledge and abstraction stack organization may utilize a first abstraction scheme stratifying the text of the novel; any summations, explanations, and critical commentaries on the novel; and outline topics identifying significant events in the novel. A second abstraction scheme would stratify the novel based upon developmental threads for the four sections, with a fifth thread for the Appendix. An abstraction stack representation could include a single lens at a first depth directed to a topical outline that identifies the significant events in the novel in chronological order, and that functions to tie the threads together in one location. A co-supplemental lens group may also be provided at a second depth directed to the text of the novel, with separate lenses in the group devoted to each development thread defined therefor. Another lens or co-supplemental lens group may also be provided at a third depth to provide either a combined or thread-specific summation, explanation and/or comment on the novel.

Any number of additional abstraction stack representations may be contemplated to represent chronologically-arranged information. For example, a body of knowledge devoted to any specific type of project, control or process could be represented, with information related to sequential steps abstracted rather than events. Abstraction levels may be defined for project summaries; step summaries, overviews, backgrounds, details, etc.; examples; purposes; and applications, among others. As one example, a recipe book could be represented in an abstraction stack in this manner.

It should be appreciated that any number of alternative body of knowledge and/or abstraction stack organizations may be utilized due to the extremely flexible and powerful constructs disclosed herein—many of which will be dependent upon the particular subject of interest being abstracted and presented to a user. As a result, the invention should not be limited to the specific examples disclosed herein. Various additional modifications may be made to the embodiments described herein without departing from the spirit and scope of the invention. Therefore, the invention lies solely in the claims hereinafter appended.

What is claimed is:

1. A computer system, comprising:

(a) a computer display;

(b) a memory configured to store at least a portion of a body of knowledge representing a collection of information about a predetermined topic, the body of knowledge stratified into a plurality of levels of abstraction including at least first and second levels of abstraction that are respectively associated with first and second development threads, the body of knowledge including a plurality of chronologically-arranged information elements, at least a portion of which associated with at least one of the first and second levels of abstraction; and (c) a processor, coupled to the computer display and memory, the processor configured to access the body of knowledge in the memory and to concurrently display on the computer display first and second representations of a common portion of the body of knowledge, the first and second representations respectively displaying first and second information elements respectively associated with the first and second levels of abstraction such that the first and second development threads are concurrently presented to the user.

2. The computer system of claim 1, wherein the processor is further configured to arrange the first and second representations generally arranged along an axis in a three dimensional workspace to represent a hierarchical relationship between the first and second representations.

3. The computer system of claim 1, wherein the first and second levels of abstraction define a first abstraction scheme, wherein the body of knowledge is further stratified according to a second abstraction scheme including first and second levels of abstraction, wherein the first and second representations are respectively associated with the first level of abstraction in the second abstraction scheme, and wherein the processor is further configured to concurrently display the first and second representations of the common portion of the body of knowledge at a common depth along an axis in a three dimensional workspace, and to concurrently display a third representation of the common portion of the body of knowledge at a second depth along the axis, the third representation associated with the second level of abstraction in the second abstraction scheme.

4. The computer system of claim 3, wherein the third representation is further associated with at least one of the first and second levels of abstraction in the first abstraction scheme.

5. The computer system of claim 1, wherein the body of knowledge is directed to a literary work.

6. The computer system of claim 5, wherein the literary work is selected from the group consisting of a novel, a historical work, a screen play, a script, a play, a short story, a bible story, a biography, and a fictional work, a non-fictional work, and a news report.

7. The computer system of claim 5, wherein at least a portion of the plurality of levels of abstraction include a first-person level of abstraction and a third-person level of abstraction.

8. The computer system of claim 5, wherein at least a portion of the plurality of levels of abstraction are stratified based upon different event sequences.

9. The computer system of claim 5, wherein at least a portion of the plurality of levels of abstraction are stratified based upon points of view of different characters in the literary work.

10. The computer system of claim 5, wherein the body of knowledge is directed to a bible story, and wherein the plurality of levels of abstraction include levels of abstraction associated with different gospels.

11. The computer system of claim 10, wherein the body of knowledge is further stratified into a second plurality of levels of abstraction, the second plurality of levels of abstraction stratified based upon different bible versions.

12. The computer system of claim 1, wherein the processor is further configured to respectively display the first and second information elements in first and second lenses, the first and second lenses being scrollable in response to user input to scroll chronologically through the body of knowledge.

13. The computer system of claim 12, wherein the processor is configured to coordinate the scrolling of the first and second lenses to maintain both lenses displaying representations of common portions of the body of knowledge.

14. The computer system of claim 12, wherein the first and second lenses are visually linked with a connector element including a plurality of line segments extending between corresponding corners of each of the first and second lenses.

15. The computer system of claim 12, wherein each lens has associated therewith a filter criteria, each filter criteria filtering out information elements associated with at least one predetermined level of abstraction.

16. The computer system of claim 15, wherein the filter criteria of at least one lens applies a focus effect to information elements associated with at least one predetermined level of abstraction.

17. The computer system of claim 1, wherein the first and second information elements are associated with a common concept in the body of knowledge, and wherein the processor is configured to visually link the first and second information elements.

18. A computer-implemented method of presenting a chronologically-arranged collection of information for access thereto by a user, the method comprising:
(a) displaying on a computer display a first representation of a portion of a body of knowledge stored in a computer, the body of knowledge stratified into a plurality of levels of abstraction including at least first and second levels of abstraction that are respectively associated with first and second development threads, the body of knowledge including a plurality of chronologically-arranged information elements, at least a portion of which associated with at least one of the first and second levels of abstraction, the first representation displaying a first information element associated with at least the first level of abstraction; and
(b) concurrently with displaying the first representation, displaying a second representation of the portion of the body of knowledge, the second representation displaying a second information element associated with at least the second level of abstraction such that the first and second development threads are concurrently presented to the user.

19. The method of claim 18, further comprising arranging the first and second representations generally along an axis in a three dimensional workspace to represent a hierarchical relationship between the first and second representations.

20. The method of claim 18, wherein the first and second levels of abstraction define a first abstraction scheme, wherein the body of knowledge is further stratified according to a second abstraction scheme including first and second levels of abstraction, wherein the first and second representations are respectively associated with the first level of abstraction in the second abstraction scheme, the method further comprising:
(a) displaying the first and second representations of the portion of the body of knowledge at a common depth along an axis in a three dimensional workspace; and
(b) concurrently displaying a third representation of the portion of the body of knowledge at a second depth along the axis, the third representation associated with the second level of abstraction in the second abstraction scheme.

21. The method of claim 20, wherein the third representation is further associated with at least one of the first and second levels of abstraction in the first abstraction scheme.

22. A program product, comprising:
(a) a program configured to perform a method of presenting a chronologically-arranged collection of information for access thereto by a user, the program including:
(1) a body of knowledge representing a collection of information about a predetermined topic, the body of knowledge stratified into a plurality of levels of abstraction including at least first and second levels of abstraction that are respectively associated with first and second development threads, the body of knowledge including a plurality of chronologically-arranged information elements, at least a portion of which associated with at least one of the first and second levels of abstraction; and
(2) an abstraction stack configured to access the body of knowledge and to concurrently display first and second representations of a common portion of the body of knowledge, the first and second representations respectively displaying first and second information elements respectively associated with the first and second levels of abstraction such that the first and second development threads are concurrently presented to the user; and
(b) a signal bearing media bearing the program.

23. The program product of claim 22, wherein the signal bearing media is transmission type media.

24. The program product of claim 22, wherein the signal bearing media is recordable media.

25. A computer system, comprising:
(a) a computer display;
(b) a memory configured to store at least a portion of a body of knowledge representing a collection of information about a predetermined topic, the body of knowledge stratified by first and second abstraction schemes, each abstraction scheme stratifying the body of knowledge into a plurality of levels of abstraction, the body of knowledge including a plurality of information elements, at least a portion of which are associated with at least one level of abstraction in at least one of the first and second abstraction schemes; and (c) a processor, coupled to the computer display and memory, the processor configured to access the body of knowledge in the memory and to concurrently display on the computer display first, second and third representations of a common portion of the body of knowledge, the first and second representations respectively displaying first and second information elements each associated with at least one level of abstraction in the first abstraction scheme, and the third representation displaying a third information element associated with at least one level of abstraction in the second abstraction scheme.

26. The computer system of claim 25, wherein the first abstraction scheme stratifies the body of knowledge into a plurality of development threads, wherein the plurality of levels of abstraction in the first abstraction scheme include first and second levels of abstraction respectively associated with first and second development threads in the body of knowledge, and wherein the processor is configured to concurrently present the first and second development threads to the user.

27. The computer system of claim 25, wherein the first and second representations of the common portion of the body of knowledge are associated with different levels of abstraction in the first abstraction scheme, and wherein the processor is further configured to arrange the first and second representations of the common portion of the body of knowledge along an axis in a three dimensional workspace to represent a hierarchical relationship therebetween.

28. The computer system of claim 27, wherein the third representation of the common portion of the body of knowledge is associated with a common level of abstraction in the first abstraction scheme as the second representation of the common portion of the body of knowledge.

29. The computer system of claim 28, wherein the processor is further configured to concurrently display the second and third representations of the common portion of the body of knowledge at a common depth along the axis.

30. The computer system of claim 29, wherein the axis is a first axis, wherein the second and third representations of the common portion of the body of knowledge are associated with different levels of abstraction in the second abstraction scheme, and wherein the processor is further configured to orient the second and third representations of the common portion of the body of knowledge along a second axis in the three dimensional workspace.

31. The computer system of claim 30, wherein the first and second axes are orthogonal to one another.

32. The computer system of claim 28, wherein the second and third representations of the common portion of the body of knowledge are associated with different levels of abstraction in the second abstraction scheme, and wherein the processor is further configured to arrange the second and third representations of the common portion of the body of knowledge along the axis to represent the hierarchical relationship therebetween.

33. A computer-implemented method of presenting a collection of information for access thereto by a user, the method comprising:

(a) concurrently displaying on a computer display first and second representations of a portion of a body of knowledge stored in a computer, the body of knowledge stratified by first and second abstraction schemes, each abstraction scheme stratifying the body of knowledge into a plurality of levels of abstraction, the body of knowledge including a plurality of information elements, at least a portion of which are associated with at least one level of abstraction in at least one of the first and second abstraction schemes, the first and second representations respectively displaying first and second information elements each associated with at least one level of abstraction in the first abstraction scheme; and (b) concurrently with displaying the first and second representations, displaying a third representation of the portion of the body of knowledge, the third representation displaying a third information element associated with at least one level of abstraction in the second abstraction scheme.

34. The method of claim 33, wherein the first abstraction scheme stratifies the body of knowledge into a plurality of development threads, wherein the first and second levels of abstraction in the first abstraction scheme are respectively associated with first and second development threads in the body of knowledge; whereby the first and second development threads are concurrently presented to the user.

35. A program product, comprising:

(a) a program configured to perform a method of presenting a collection of information for access thereto by a user, the program including:

(1) a body of knowledge representing a collection of information about a predetermined topic, the body of knowledge stratified by first and second abstraction schemes, each abstraction scheme stratifying the body of knowledge into a plurality of levels of abstraction, the body of knowledge including a plurality of information elements, at least a portion of which are associated with at least one level of abstraction in at least one of the first and second abstraction schemes; and (2) an abstraction stack configured to access the body of knowledge and to concurrently display first, second and third representations of a common portion of the body of knowledge, the first and second representations respectively displaying first and second information elements each associated with at least one level of abstraction in the first abstraction scheme, and the third representation displaying a third information element associated with at least one level of abstraction in the second abstraction scheme; and (b) a signal bearing media bearing the program.

36. The program product of claim 35, wherein the signal bearing media is transmission type media.

37. The program product of claim 35, wherein the signal bearing media is recordable media.

* * * * *